US011491575B2

(12) United States Patent
Larouche et al.

(10) Patent No.: US 11,491,575 B2
(45) Date of Patent: Nov. 8, 2022

(54) ELECTRON BEAM MELTING ADDITIVE MANUFACTURING MACHINE WITH DYNAMIC ENERGY ADJUSTMENT

(71) Applicants: AP&C Advanced Powders & Coatings Inc., Boisbriand (CA); Arcam AB, Moelndal (SE)

(72) Inventors: Frederic Larouche, Saint-Colomban (CA); Isak Elfström, Kungsbacka (SE)

(73) Assignees: ARCAM AB, Moelndal (SE); AP&C ADVANCED POWERS & COATINGS INC., Boisbriand (CA)

( * ) Notice: Subject to any disclaimer, the term of this patent is extended or adjusted under 35 U.S.C. 154(b) by 584 days.

(21) Appl. No.: 16/385,417

(22) Filed: Apr. 16, 2019

(65) Prior Publication Data

US 2020/0331090 A1    Oct. 22, 2020

(51) Int. Cl.
| | | |
|---|---|---|
| *B23K 15/00* | (2006.01) | |
| *B33Y 10/00* | (2015.01) | |
| *B33Y 30/00* | (2015.01) | |
| *B33Y 50/02* | (2015.01) | |
| *B29C 64/153* | (2017.01) | |
| *B29C 64/20* | (2017.01) | |
| *B29C 64/393* | (2017.01) | |

(52) U.S. Cl.
CPC ........ *B23K 15/0086* (2013.01); *B29C 64/153* (2017.08); *B29C 64/20* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/20; B29C 64/153; B29C 64/393; B29C 64/268; B33Y 10/00; B33Y 30/00; B33Y 50/02; B23K 15/0086; B22F 10/20; B22F 10/30; B22F 3/003
See application file for complete search history.

(56) References Cited

U.S. PATENT DOCUMENTS

| | | |
|---|---|---|
| 5,196,901 A | 3/1993 | Champetier |
| 8,093,567 B2 | 1/2012 | Lagaree et al. |
| 8,597,565 B2 | 12/2013 | Faber et al. |
| 8,598,523 B2 | 12/2013 | Stecker et al. |
| 8,809,780 B2 | 8/2014 | Wollenhaupt et al. |
| 9,297,727 B2 | 3/2016 | Buxbaum |

(Continued)

FOREIGN PATENT DOCUMENTS

| | | |
|---|---|---|
| CN | 106180718 A | 12/2016 |
| CN | 109465531 A | 3/2019 |

(Continued)

OTHER PUBLICATIONS

European Search Report Corresponding to Application No. 20167356 dated Aug. 25, 2020.

*Primary Examiner* — Nahida Sultana
(74) *Attorney, Agent, or Firm* — Dority & Manning, P.A.

(57) ABSTRACT

An electron beam melting machine and a method of operation are provided which maintains constant energy absorption within a build layer by adjusting an incident energy level to compensate for energy not absorbed by the additive powder. This unabsorbed energy is detected in the form of electron emissions, which include secondary electrons, backscattered electrons, and/or electrons which are transmitted through the build platform.

20 Claims, 3 Drawing Sheets

(56) References Cited

U.S. PATENT DOCUMENTS

| | | | |
|---|---|---|---|
| 2012/0112062 A1* | 5/2012 | Novak | H01J 37/244 250/307 |
| 2013/0055568 A1* | 3/2013 | Dusel | B22F 12/00 29/888.02 |
| 2015/0034606 A1 | 2/2015 | Blackmore | |
| 2015/0037601 A1 | 2/2015 | Blackmore | |
| 2016/0299103 A1 | 10/2016 | Saleh et al. | |
| 2016/0343537 A1* | 11/2016 | Shanley | H01J 37/22 |
| 2017/0294291 A1 | 10/2017 | Saleh et al. | |
| 2017/0297140 A1* | 10/2017 | Taminger | B23K 15/06 |
| 2018/0126670 A1* | 5/2018 | DehghanNiri | B29C 64/393 |
| 2019/0147578 A1* | 5/2019 | Hellestam | H01J 3/028 250/395 |

FOREIGN PATENT DOCUMENTS

| WO | WO2011/059621 A1 | 5/2011 |
|---|---|---|
| WO | WO2018/217646 A1 | 11/2018 |

\* cited by examiner

ELECTRON BEAM MELTING ADDITIVE MANUFACTURING MACHINE WITH DYNAMIC ENERGY ADJUSTMENT

FIELD

The present disclosure generally relates to additive manufacturing machines and processes, and more particularly to electron beam melting machines that maintain target energy absorption within a powder layer during a print process.

BACKGROUND

Additive manufacturing processes generally involve the buildup of one or more materials to make a net or near net shape (NNS) object, in contrast to subtractive manufacturing methods. Though "additive manufacturing" is an industry standard term, additive manufacturing encompasses various manufacturing and prototyping techniques known under a variety of additive manufacturing terms, including freeform fabrication, 3D printing, rapid prototyping/tooling, etc. Additive manufacturing techniques are capable of fabricating complex components from a wide variety of materials. Generally, a freestanding object can be fabricated from a computer aided design (CAD) model.

Electron beam melting (EBM) is a common industry term used to refer to producing three-dimensional (3D) objects by using an electron beam to sinter, melt, or otherwise fuse a fine powder. During an EBM process, the powder to be melted by the electron beam is spread evenly over a powder bed on a build platform, and the electron beam sinters or melts a cross sectional layer of the object being built under control of an electronic control unit or an emission directing device. The build platform is lowered and another layer of powder is spread over the powder bed and object being built, followed by successive melting/sintering of the powder. The process is repeated until the part is completely built up from the melted/sintered powder material.

Notably, the surface chemistry of additive powder naturally varies as the additive powder ages and picks up impurities. Moreover, the surface chemistry of the additive powder can significantly affect the secondary electron emissions of the powder layer and can lead to variability in the energy absorbed by the additive powder. When the energy level of the electron beam remains constant at a target energy level, these variations in powder energy absorption may lead to over-melting, under-melting, or otherwise improper fusing of the additive powder. This improper fusing of the additive powder can result in build imperfections, warping, delamination, microstructure variation, and other printing irregularities which result in lower quality parts, structural weaknesses, and even defective parts.

Accordingly, an additive manufacturing machine that facilitates a more stabilized build process that generates fewer defective or suboptimal parts would be useful. More particularly, an electron beam melting machine that is capable of detecting electron emissions or energy deposition and adjusting the electron beam to maintain constant energy at the powder layer would be particularly beneficial.

BRIEF DESCRIPTION

Aspects and advantages will be set forth in part in the following description, or may be obvious from the description, or may be learned through practice of the invention.

According to one embodiment of the present subject matter, a method of operating an additive manufacturing machine is provided. The method includes depositing a layer of additive powder over a build platform movably positioned within a build chamber, directing an electron beam toward the layer of additive powder at an incident energy level and energy density, measuring electron emissions from the layer of additive powder, and adjusting at least one of the incident energy level and energy density of the electron beam based at least in part on the measured electron emissions.

According to another exemplary embodiment, an additive manufacturing machine is provided including a build platform configured for supporting a component and being movable along a vertical direction within a build chamber, a powder dispensing assembly for selectively depositing a layer of additive powder over the build platform, and an energy source for selectively directing an electron beam onto the layer of additive powder. An emission detection system detects electron emissions from the layer of additive powder and a controller is operably coupled to the energy source and the emission detection system. The controller is configured for directing the electron beam toward the layer of additive powder at an incident energy level and energy density, measuring the electron emissions from the layer of additive powder, and adjusting at least one of the incident energy level and the energy density of the electron beam based at least in part on the measured electron emissions.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is generally directed to an improved additive manufacturing system and method utilizing an electron beam melting (EBM) process. Specifically, aspects of the present subject matter are directed toward improved power control in an EBM process, e.g., by dynamically adjusting the energy delivered to the powder bed for fusing additive powders. The incident energy level is adjusted to compensate for energy not absorbed by the additive powder. This unabsorbed energy is detected in the form of electron emissions, which include secondary electrons and/or electrons which are transmitted through the build platform. In this manner, the EBM machine maintains constant energy absorption within a build layer for improved process control, fewer defects, and higher quality printed components.

Figure 1:
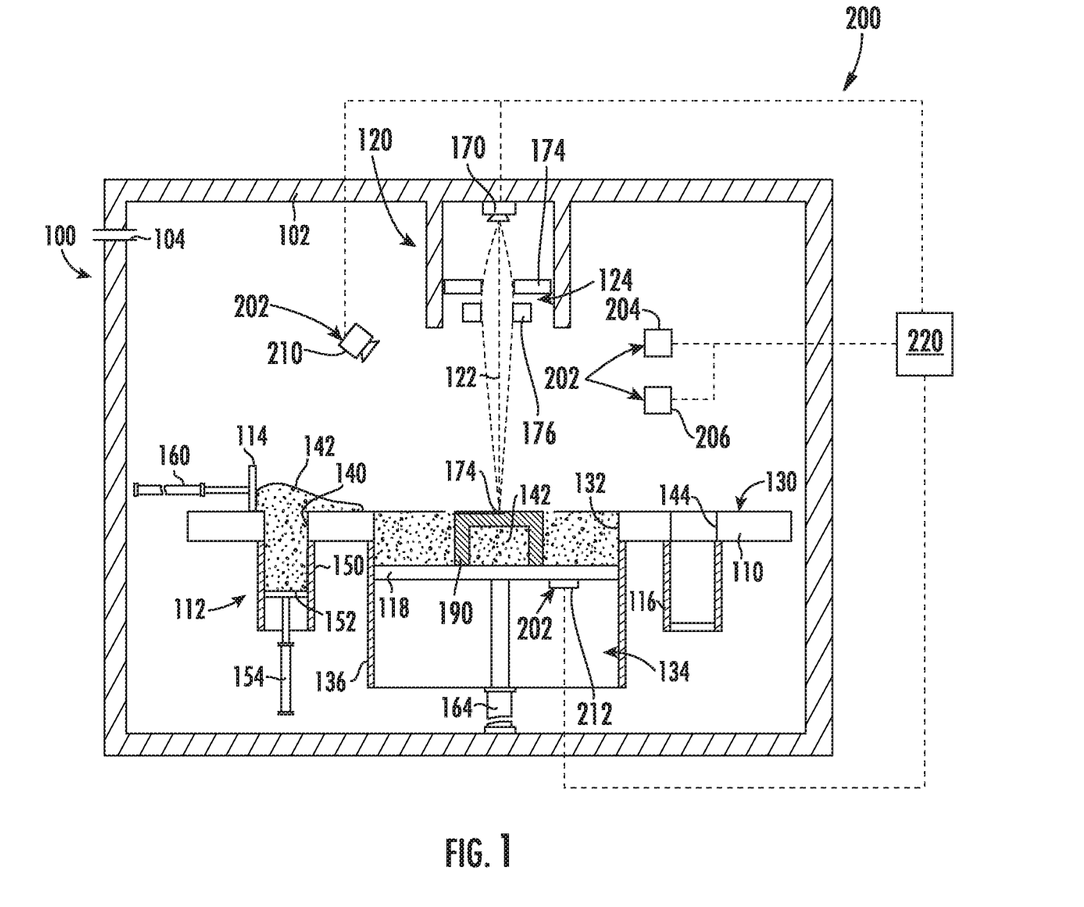
FIG. 1 shows a schematic view of an additive manufacturing machine according to an exemplary embodiment of the present subject matter.

Referring to FIG. 1, an electron beam melting (EBM) system 100 will be described according to an exemplary embodiment. As illustrated, system 100 includes a fixed enclosure or build area 102 which provides a contaminant-free and controlled environment for performing an additive manufacturing process. In this regard, for example, enclosure 102 serves to isolate and protect the other components of the system 100. In addition, enclosure 102 may include a vacuum port 104 which is used to draw a vacuum within build area 102, e.g., to reduce the scattering of electrons during the printing process.

Enclosure 102 may generally contain some or all components of EBM system 100. According to an exemplary embodiment, EBM system 100 generally includes a table 110, a powder supply 112, a scraper or recoater mechanism 114, an overflow container or reservoir 116, and a build platform 118 positioned within enclosure 102. In addition, an energy source 120 generates an energy beam 122 and a beam steering apparatus 124 directs energy beam 122 to facilitate the EBM process, as described in more detail below. Each of these components of EBM system 100 will be described in more detail below.

According to the illustrated embodiment, table 110 is a rigid structure defining a planar build surface 130. In addition, planar build surface 130 defines a build opening 132 through which build chamber 134 may be accessed. More specifically, according to the illustrated embodiment, build chamber 134 is defined at least in part by vertical walls 136 and build platform 118. In addition, build chamber 134 generally defines the bounds of the "powder bed," which includes both the part or parts being built and the additive powder 142 which was used to form those parts. Build surface 130 further defines a supply opening 140 through which additive powder 142 may be supplied from powder supply 112 and a reservoir opening 144 through which excess additive powder 142 may pass into overflow reservoir 116. Collected additive powders may optionally be treated to sieve out loose, agglomerated particles before re-use.

Powder supply 112 generally includes an additive powder supply container 150 which generally contains a volume of additive powder 142 sufficient for some or all of the additive manufacturing process for a specific part or parts. In addition, powder supply 112 includes a supply platform 152, which is a plate-like structure that is movable along the vertical direction within powder supply container 150. More specifically, a supply actuator 154 vertically supports supply platform 152 and selectively moves it up and down during the additive manufacturing process.

EBM system 100 further includes recoater mechanism 114, which is a rigid, laterally-elongated structure that lies proximate build surface 130. For example, recoater mechanism 114 may be a hard scraper, a soft squeegee, or a roller. Recoater mechanism 114 is operably coupled to a recoater actuator 160 which is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

As used herein, "energy source" may be used to refer to any device or system of devices configured for directing an energy beam of suitable power and other operating characteristics towards a layer of additive powder to sinter, melt, or otherwise fuse a portion of that layer of additive powder during the build process. According to an exemplary embodiment, energy source 120 may include an electron source, such as an electron beam gun 170, which may be any suitable electron emitter or other source that generates a beam of electrons, referred to herein as an electron beam or energy beam 122.

In addition, the "beam steering apparatus" 124 may be any suitable device or system of devices for guiding or directing electron beam 122, preferably in a vacuum. According to an exemplary embodiment, beam steering apparatus 124 includes one or more electronic control units, valves, magnetic lenses, deflection coils, focusing coils, or other components operably coupled with suitable actuators and arranged to direct and focus electron beam 122. Specifically, as illustrated, beam steering apparatus 124 includes a magnetic lens 174 and a deflection coil 176 for directing electron beam 122 onto a desired location on the powder bed.

Figure 2:
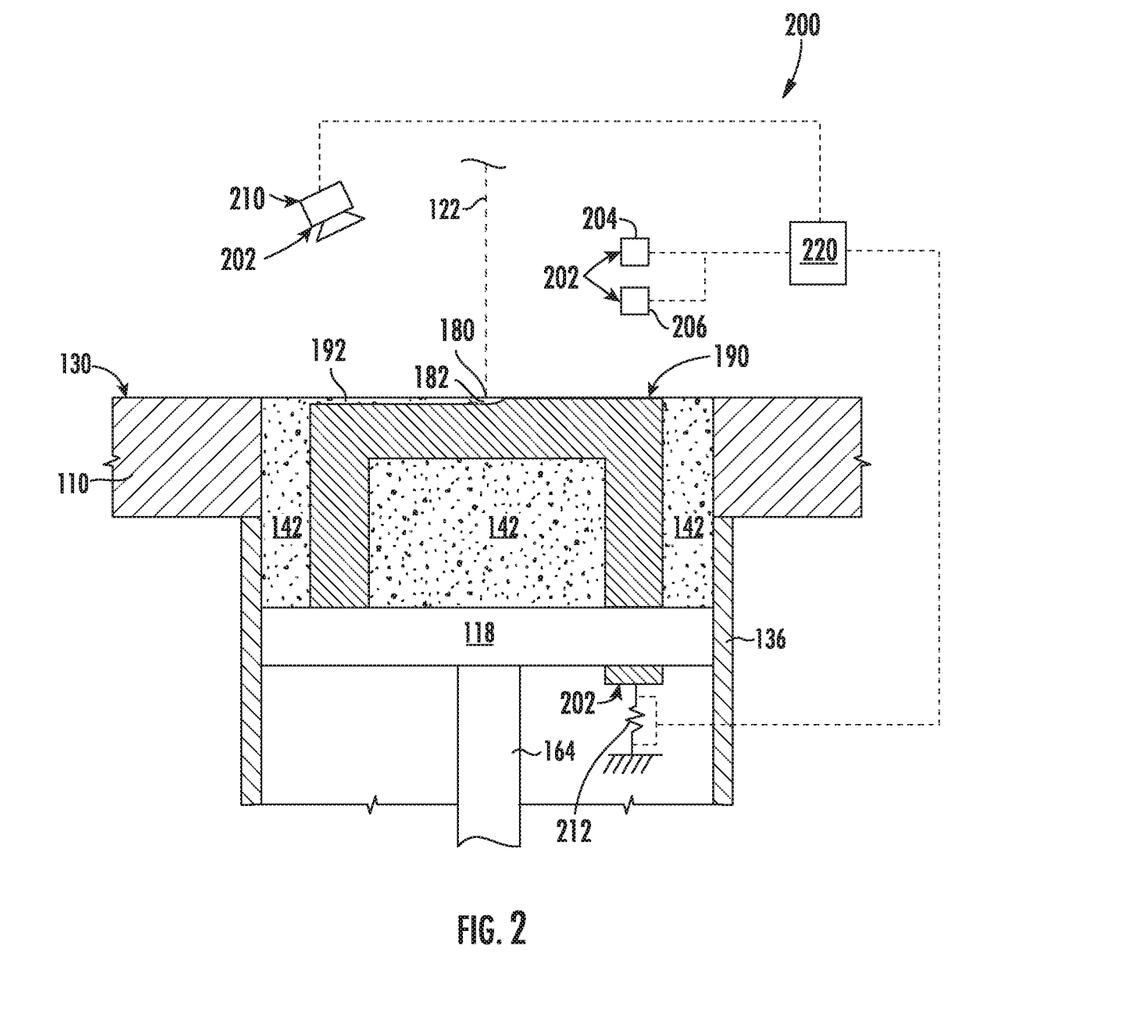
FIG. 2 shows a close-up schematic view of a build platform of the exemplary additive manufacturing machine of FIG. 1 according to an exemplary embodiment of the present subject matter.

Specifically, as best shown in FIG. 2, beam steering apparatus 124 is configured for moving or scanning a focal point 180 of electron beam 122 across the build surface 130 during the electron beam melting and/or sintering processes. In this regard, electron beam 122 can be focused to a desired spot size and steered to a desired position in plane coincident with build surface 130. Moreover, the power or energy level of electron beam 122 may be adjusted by electron beam gun 170 to increase or decrease a size of a melt pool 182, as described in more detail below. It should be appreciated that other types of energy sources 120 may be used and alternative beam steering apparatus 124 may be used for directing an energy beam 122 while remaining within the scope of the present subject matter.

Prior to an additive manufacturing process, supply actuator 154 may be lowered to provide a supply of powder 142 of a desired composition (for example, metallic and/or organic powder) into supply container 150. In addition, platform actuator 164 may move build platform 118 to an initial high position, e.g., such that it substantially flush or coplanar with build surface 130. Build platform 118 is then lowered below build surface 130 by a selected layer increment. The layer increment affects the speed of the additive manufacturing process and the resolution of a components or parts 190 being manufactured. As an example, the layer increment may be about 10 to 100 micrometers (0.0004 to 0.004 in.).

Additive powder is then deposited over the build platform 118 before being fused by energy source 120. Specifically, supply actuator 154 may raise supply platform 152 to push powder through supply opening 140, exposing it above build surface 130. Recoater mechanism 114 may then be moved across build surface 130 by recoater actuator 160 to spread the raised additive powder 142 horizontally over build platform 118 (e.g., at the selected layer increment or thickness). The additive powder 142 that is spread over the powder bed at the desired thickness may be referred to herein as the build layer 192. Any excess additive powder 142 drops through the reservoir opening 144 into the overflow reservoir 116 as recoater mechanism 114 passes from left to right (as shown in FIG. 1). Subsequently, recoater mechanism 114 may be moved back to a starting position.

Therefore, as explained herein and illustrated in FIG. 1, recoater mechanism 114, recoater actuator 160, supply platform 152, and supply actuator 154 may generally operate to successively deposit layers of additive powder 142 or other additive material to facilitate the print process. As such, these components may collectively be referred to herein as powder depositing apparatus, system, or assembly. The leveled additive powder 142 may be referred to as build layer 192 (see FIG. 2) and the exposed upper surface thereof may be referred to as build surface 130. When build platform 118 is lowered into build chamber 134 during a build process, build chamber 134 and build platform 118 collectively surround and support a mass of additive powder 142 along with any components 190 being built. This mass of powder is generally referred to as a "powder bed," and this specific category of additive manufacturing process may be referred to as a "powder bed process."

During the additive manufacturing process, the directed energy source 120 is used to melt a two-dimensional cross-section or layer of the component 190 being built. More specifically, electron beam 122 is emitted from energy source 120 and beam steering apparatus 124 is used to steer the focal point 180 of electron beam 122 over the exposed powder surface in an appropriate pattern. A small portion of exposed layer of the additive powder 142 surrounding focal point 180, referred to herein as a "weld pool" or "melt pool" or "heat effected zone" 182 (best seen in FIG. 2) is heated by electron beam 122 to a temperature allowing it to sinter or melt, flow, and consolidate. As an example, melt pool 182 may be on the order of 100 micrometers (0.004 in.) wide. This step may be referred to as fusing additive powder 142.

Build platform 118 is moved vertically downward by the layer increment, and another layer of additive powder 142 is applied in a similar thickness. The directed energy source 120 again emits electron beam 122 and beam steering apparatus 124 is used to steer the focal point 180 of electron beam 122 over the exposed powder surface in an appropriate pattern. The exposed layer of additive powder 142 is heated by electron beam 122 to a temperature allowing it to sinter or melt, flow, and consolidate both within the top layer and with the lower, previously-solidified layer. This cycle of moving build platform 118, applying additive powder 142, and then directed electron beam 122 to melt additive powder 142 is repeated until the entire component 190 is complete.

As explained briefly above, as energy source 120 and beam steering apparatus 124 direct electron beam 122 onto the powder bed or build surface 130, the additive powders 142 are heated and begin to melt into melt pool 182 where they may fused to form the final component 190. Notably, during the step of sintering or melting additive powder, not all of the energy emitted by the electron beam gun 170 in the form of a beam of electrons or electron beam 122 is absorbed by the build layer 192. Specifically, a portion of the electrons may be transmitted through the powder bed and build platform 118, some electrons are redirected or otherwise remerge when they impact the additive powder 142, and some of the energy is expelled as secondary electron and backscattered electron emissions.

As explained above, the surface chemistry of additive powder naturally varies as the additive powder ages, and surface chemistry variations can significantly affect the amount of energy absorbed by the additive powder. When the energy level of the electron beam remains constant at a target energy level, these variations in powder energy absorption may lead to over-melting, under-melting, or otherwise improper fusing of the additive powder. This improper fusing of the additive powder can result in build imperfections, warping, delamination, microstructure fluctuation, and other printing irregularities which result in lower quality parts, structural weaknesses, and even defective parts.

Therefore, aspects of the present subject matter are directed to an emission detection system 200 which may be used with an electron beam melting machine or to facilitate an EBM process. Specifically, referring still to FIGS. 1 and 2, emission detection system 200 will be illustrated and described as being used with EBM system 100. Specifically, emission detection system 200 is generally configured for detecting electron emissions from the powder bed or the layer of additive powder, e.g., build layer 192, as it is being fused by energy source 120. Although exemplary emission detection devices are described below according to an exemplary embodiment, it should be appreciated that emission detection system 200 may include various additional or alternative sensors for detecting electron emissions.

As explained above, energy source 120 is configured for generating electron beam 122 for fusing additive powder 142. As used herein, the "incident" electron beam, energy level, and similar terms are intended to refer or correspond to the electron beam generated by the energy source prior to contact with the additive powder, e.g., energy beam or electron beam 122 as illustrated in FIGS. 1 and 2. In addition, "electron emissions" and the like are used to refer to electrons that are generated or redirected by the powder bed or build layer when exposed to the incident electron beam. For example, electron emissions include reflected, scattered, deflected, and/or transmitted electrons, or other electrons not absorbed by the layer of additive material or the powder bed during the fusing process. In addition, electron emissions, the associated energy, and the like may be used generally to refer to the amount of energy actually held by such electrons. In this regard, according to an exemplary embodiment, the electron emissions are multiplied by an average energy held by such electrons.

Emission detection system 200 includes one or more emission detection devices 202 for measuring, detecting, or monitoring such electron emissions. Specifically, according to an exemplary embodiment, emission detection device 202 includes an Everhart Thornley detector 204 for detecting secondary electrons. In addition, emission detection devices 202 may include a solid-state detector 206 for detecting backscattered electrons. These emission detection devices 202 may be positioned at any suitable location within or around build chamber 134 where electron emissions may be monitored or measured. In general, secondary electrons may refer to electrons emitted by atoms near the surface of the build layer when their electrons become excited and have sufficient energy to escape the build layer. By contrast, backscattered electrons may refer to electrons that reemerge from the build layer or the melt pool.

Although Everhart Thornley detector 204 is described herein as being used to detect secondary electron emissions and/or backscattered electron emissions and solid-state detector 206 is described herein as being used to detect backscattered electron emissions, it should be appreciated that any other suitable device or devices may be used to detect one or both of secondary and backscattered electrons. For example, Everhart Thornley detector 204 may detect both. In addition, such devices may be positioned at multiple locations throughout build chamber 134 and may have any other suitable configuration suitable for measuring electron emissions.

According to alternative embodiments, the electron emissions or energy deposited may be approximated by the mapping a powder bed temperature or taking a thermal image of the powder bed or melt pool 182 during the fusing process. In this regard, for example, emission detection system 200 may include a thermal imaging camera 210 which is positioned within build chamber 134 over the powder bed for taking a thermal image or otherwise approximating a temperature of melt pool 182. For example, according to an exemplary embodiment, thermal imaging camera 210 may be a high-speed infrared camera. By monitoring the temperature of melt pool 182, the amount of electron emissions may be approximated and used as described herein for maintaining constant energy absorption within build layer 192.

According to still other embodiments, emission detection system 200 may include devices for measuring electron emissions which pass through build layer 192 and/or powder bed. For example, emission detection devices 202 may further include a resistor 212 which is electrically connected to the build platform 118 for measuring electrons flowing therethrough. More specifically, build platform 118 may be electrically insulated from build chamber 134 and resistor 212 may electrically couple build platform 118 to an electrical ground. Thus, electrons absorbed into the powder bed, e.g., referred to herein as "transmitted" electrons, pass through the powder bed, through build platform 118, and through resistor 212 to ground. Notably, by measuring a voltage generated across resistor 212, the amount of energy or electrons transmitted through the powder bed may be measured (e.g., 1 mA×1 kOhm=1V). According to still other embodiments, other methods of measuring secondary and backscattered electrons may be used, such as measuring the current flowing within the EBM chamber 102, which should be linked to the electron emissions (e.g., both secondary and backscattered emissions).

EBM system 100 may further include any suitable processor or controller for regulating operation of EBM system 100 and/or emission detection system 200. Specifically, as illustrated, emission detection system 200 further includes a controller 220 which is operably coupled with emission detection devices 202 for receiving signals corresponding to the measured electron emissions. In addition, controller 220 may be operably coupled to energy source 120, e.g., for controlling the power or energy density of electron beam 122, for adjusting the operation of magnetic lens 174 and deflecting coil 176, etc. Controller 220 may be a dedicated controller for emission detection system 200 or may be a system controller for operating EBM system 100.

Controller 220 may include one or more memory devices and one or more microprocessors, such as general or special purpose microprocessors operable to execute programming instructions or micro-control code associated with an additive manufacturing process or process monitoring. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 220 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

It should be appreciated that EBM system 100 and emission detection system 200 are illustrated and described herein only for explaining aspects of the present subject matter. However, the scope of the present subject matter is not limited to such exemplary embodiments, but is instead contemplated as including embodiments including variations and modifications. For example, EBM system 100 may include a different type or configuration of energy source, a different recoater mechanism, additional system or subsystems for facilitating the EBM process, etc. In addition, emission detection system 200 may include additional or alternative sensor types, positions, and configurations. Other configurations are possible and within the scope of the present subject matter.

Now that the construction and configuration of EBM system 100 and emission detection system 200 have been described according to exemplary embodiments of the present subject matter, an exemplary method 300 for operating an EBM machine will be described according to an exemplary embodiment of the present subject matter. Method 300 can be used to operate EBM system 100, or any other suitable additive manufacturing machine. In this regard, for example, controller 220 may be configured for implementing some or all steps of method 300. Further, it should be appreciated that the exemplary method 300 is discussed herein only to describe exemplary aspects of the present subject matter, and is not intended to be limiting.

To simplify analysis, an exemplary method described herein assumes that all electrons within the EBM system 100 are either absorbed electrons (e.g., used to fuse the additive powder), secondary electrons (e.g., emitted by melt pool 182), backscattered electrons (e.g., reemerging from melt pool 182 into the build chamber), or transmitted electrons (e.g., passed through the powder bed). Specifically, according to such an exemplary embodiment, the sum of the measured electron emissions (including secondary, backscattered, and transmitted electrons) and the absorbed electrons is substantially equal to the incident energy level or the electrons generated by the energy source. It should be appreciated that as used herein, terms of approximation, such as "approximately," "substantially," or "about," refer to being within a ten percent margin of error. Thus, because the incident energy level is known (and controlled) and the electron emissions may be measured, the absorbed electrons may be calculated or determined. Furthermore, the absorbed electrons may be maintained at a constant level or may track a target energy level by dynamically adjusting the incident energy level and/or the energy density of the energy beam (e.g., determined as a function of beam diameter, focal point size, etc.) to compensate for electron emissions.

Figure 3:
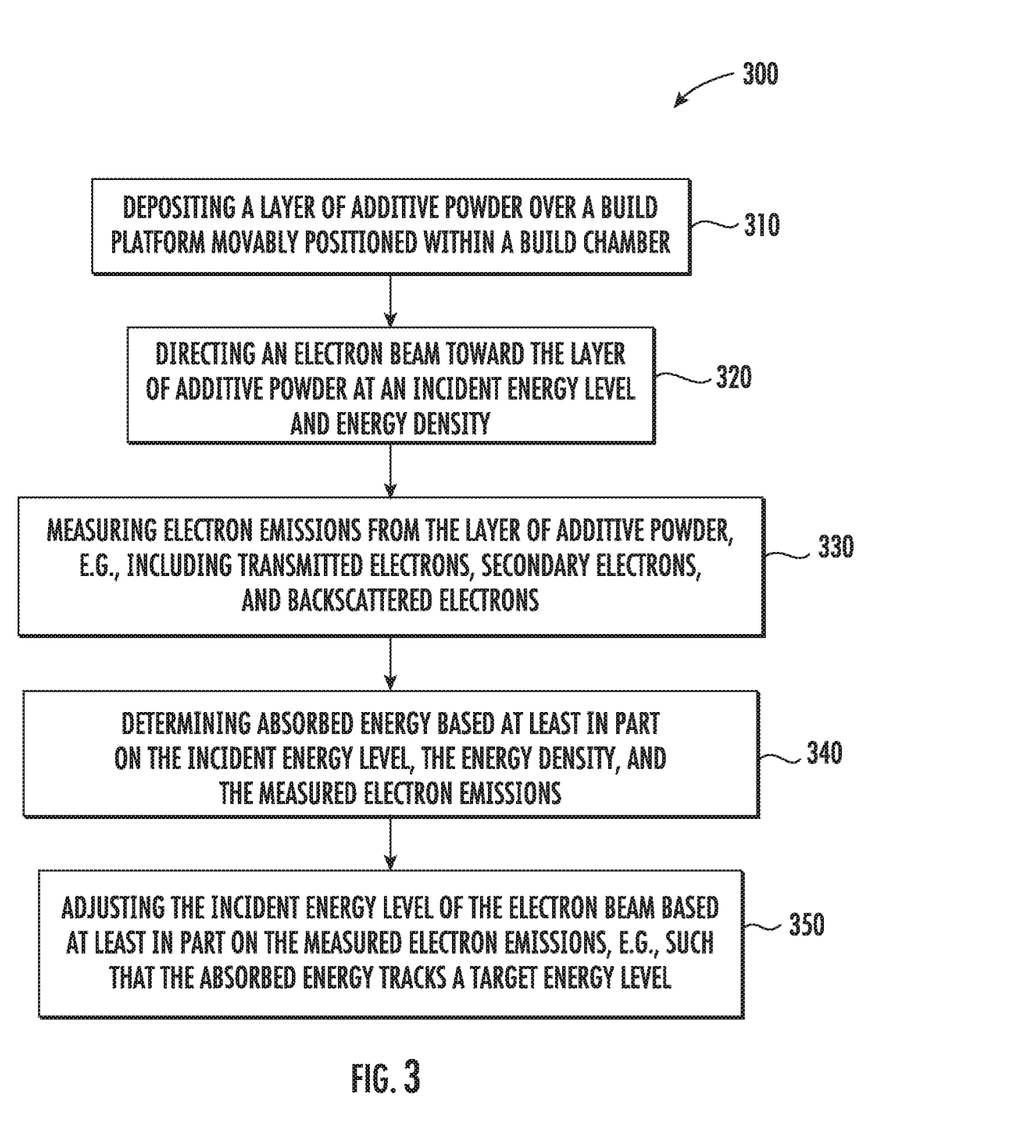
FIG. 3 is a method of operating an additive manufacturing machine, such as an electron beam melting machine, in accordance with one embodiment of the present disclosure.

Referring now to FIG. 3, method 300 includes, at step 310, depositing a layer of additive powder over a build platform positioned within the build chamber. Once a build layer of the desired thickness is deposited, step 320 includes directing an electron beam towards the layer of additive powder at an incident energy level. As explained above, the incident energy level may be quantified as the amount electrons or the total energy emitted from electron beam gun 170 and directed toward build layer 192.

Step 330 includes measuring electron emissions from the layer of additive powder. As explained above, electron emissions generally refer to any electrons directed from energy source 120 which are not absorbed into build layer 192. For example, these electron emissions may include secondary electrons, backscattered electrons, and transmitted electrons. According to the illustrated embodiment, secondary electron emissions are measured using one or more Everhart Thornley detectors, backscattered electrons are measured using solid-state detectors and/or Everhart Thornley detectors, and transmitted electrons are measured by monitoring a current through build platform 118.

Step 340 includes determining the absorbed energy (i.e., the total energy or number of electrons absorbed within build layer 192) based at least in part on the incident energy level in the measured electron emissions. In this regard, for example, the sum of the absorbed electrons in the electron emissions (including secondary, backscattered, and transmitted electrons) should be equal to the incident energy level. The surface chemistry is believed to mostly affect the secondary electron emission because of the small thickness of the modified surface layer. Thus, the absorbed energy may generally be determined by subtracting the measured electron emissions from the incident energy level.

Step 350 includes adjusting the incident energy level of the electron beam based at least in part on the measured electron emissions. In this regard, the incident energy level of electron beam 122 (e.g., including both total beam energy and energy density) may be adjusted by controller 220 in response to measured electron emissions such that the absorbed energy tracks a target energy level. For example, the target energy level may vary depending on the position of the focal point 180, on the type of additive powder used, the thickness of build layer 192, etc. In this manner, method 300 facilitates the adjustment of the incident energy level of electron beam 122 to compensate for fluctuations in electron emissions, resulting in more control over the build process and higher quality parts or components 190.

FIG. 3 depicts an exemplary control method having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained using EBM system 100 and emission monitoring system 200 as an example, it should be appreciated that these methods may be applied to the operation of any suitable monitoring system of any suitable additive manufacturing machine.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an additive manufacturing machine comprising:
   depositing a layer of additive powder over a build platform movably positioned within a build chamber;
   directing an electron beam toward the layer of additive powder at an incident energy level and energy density;
   measuring electron emissions from the layer of additive powder by measuring an electric current that passes through the build platform of the additive manufacturing machine;
   measuring the electric current by measuring a voltage across a resistor electrically connected to the build platform; and
   adjusting at least one of the incident energy level and energy density of the electron beam based at least in part on the measured electron emissions to compensate for the measured electron emissions to maintain absorbed energy at a target energy level.

2. The method of claim 1, wherein measuring the electron emissions further comprises:
   determining transmitted electrons based at least in part on the measured electric current.

3. The method of claim 1, wherein the build platform is electrically insulated from the build chamber.

4. The method of claim 1, wherein measuring the electron emissions comprises:
   measuring secondary electrons and backscattered electrons.

5. The method of claim 4, wherein the secondary electrons and the backscattered electrons are measured using an Everhart Thornley detector.

6. The method of claim 1, wherein measuring the electron emissions comprises:
   measuring a temperature of the layer of additive powder using a thermal imaging device; and
   determining secondary electrons and the backscattered electrons based at least in part on the measured temperature.

7. The method of claim 6, wherein the thermal imaging device is a high speed infrared camera.

8. The method of claim 1, further comprising:
   determining absorbed energy based at least in part on the incident energy level, the energy density, and the measured electron emissions.

9. The method of claim 8, wherein the absorbed energy is equal to the incident energy level minus the energy from the measured electron emissions.

10. The method of claim 1, wherein the measured electron emissions comprise transmitted electrons that pass through the build platform, secondary electrons generated at the layer of additive powder, and backscattered electrons reemerging from the layer of additive powder.

11. An additive manufacturing machine comprising:
    a build platform configured for supporting a component within a build chamber;
    a powder dispensing assembly for selectively depositing a layer of additive powder over the build platform;
    an energy source for selectively directing an electron beam onto the layer of additive powder;
    an emission detection system for detecting electron emissions from the layer of additive powder; and
    a controller operably coupled to the energy source and the emission detection system, the controller being configured for:

directing the electron beam toward the layer of additive powder at an incident energy level and energy density;

measuring the electron emissions from the layer of additive powder by measuring an electric current that passes through the build platform of the additive manufacturing machine;

measuring the electric current by measuring a voltage across a resistor electrically connected to the build platform; and adjusting at least one of the incident energy level and the energy density of the electron beam based at least in part on the measured electron emissions to compensate for the measured electron emissions to maintain absorbed energy at a target energy level.

12. The additive manufacturing machine of claim 11, wherein measuring the electron emissions further comprises:

determining transmitted electrons based at least in part on the measured electric current.

13. The additive manufacturing machine of claim 11, wherein the build platform is electrically insulated from the build chamber.

14. The additive manufacturing machine of claim 11, wherein measuring the electron emissions comprises:

measuring secondary electrons and backscattered electrons using an Everhart Thornley detector.

15. The additive manufacturing machine of claim 11, wherein measuring the electron emissions comprises:

measuring a temperature of the layer of additive powder using a thermal imaging device; and determining secondary electrons and the backscattered electrons based at least in part on the measured temperature.

16. The additive manufacturing machine of claim 15, wherein the thermal imaging device is a high speed infrared camera.

17. The additive manufacturing machine of claim 11, further comprising:

determining absorbed energy based at least in part on the incident energy level, the energy density, and the energy from the measured electron emissions.

18. The additive manufacturing machine of claim 17, wherein the absorbed energy is equal to the incident energy level minus the energy from the measured electron emissions.

19. A method of operating an additive manufacturing machine comprising:

depositing a layer of additive powder over a build platform movably positioned within a build chamber;

directing an electron beam toward the layer of additive powder at an incident energy level and energy density;

measuring electron emissions from the layer of additive powder by measuring an electric current that passes through the build platform and determining transmitted electrons based at least in part on the measured electric current;

measuring the electrical current by measuring a voltage across a resistor electrically connected to the build platform; and adjusting at least one of the incident energy level and energy density of the electron beam based at least in part on the measured electron emissions.

20. The method of claim 19, wherein the build platform is electrically insulated from the build chamber.

* * * * *